United States Patent
Larsson et al.

(10) Patent No.: US 9,621,086 B2
(45) Date of Patent: Apr. 11, 2017

(54) METHOD AND CIRCUIT ASSEMBLY FOR DRIVING A STEPPER MOTOR

(71) Applicant: TRINAMIC MOTION CONTROL GMBH & CO. KG, Hamburg (DE)

(72) Inventors: Lars Larsson, Hamburg (DE); Bernhard Dwersteg, Rellingen (DE)

(73) Assignee: TRINAMIC MOTION CONTROL GMBH & CO. KG, Hamburg (DE)

( * ) Notice: Subject to any disclaimer, the term of this patent is extended or adjusted under 35 U.S.C. 154(b) by 0 days.

(21) Appl. No.: 14/407,939

(22) PCT Filed: Jun. 20, 2013

(86) PCT No.: PCT/DE2013/100225
§ 371 (c)(1),
(2) Date: Dec. 12, 2014

(87) PCT Pub. No.: WO2013/189492
PCT Pub. Date: Dec. 27, 2013

(65) Prior Publication Data
US 2015/0123590 A1    May 7, 2015

(30) Foreign Application Priority Data
Jun. 20, 2012 (DE) .................. 10 2012 105 362

(51) Int. Cl.
*H02P 8/00* (2006.01)
*H02P 8/22* (2006.01)
*H02P 8/12* (2006.01)

(52) U.S. Cl.
CPC . *H02P 8/22* (2013.01); *H02P 8/12* (2013.01)

(58) Field of Classification Search
CPC .. H02P 8/22; H02P 1/163; H02P 29/02; H02P 6/002; H02P 6/16; H02P 6/22;
(Continued)

(56) References Cited

U.S. PATENT DOCUMENTS 3,855,781 A * 12/1974 Chihara ................. G04C 3/143
 318/717
4,477,756 A * 10/1984 Moriguchi ............... H02P 8/42
 318/685

(Continued)

FOREIGN PATENT DOCUMENTS

DE 19524118 A1 1/1997
DE 19842698 A1 3/2000

OTHER PUBLICATIONS

International Search Report (Mar. 19, 2014) for corresponding International application No. PCT/DE2013/100225.

*Primary Examiner* — Paul Ip
(74) *Attorney, Agent, or Firm* — WRB-IP LLP

(57) ABSTRACT

A method and a circuit assembly for driving a 2-, 3- or more phase stepper motor by predetermined courses of current curves, especially for a microstep operation, is disclosed. For minimizing the memory capacity needed for storing supporting points of the course of the current curve by which the microsteps are realized, the course of the current curve is divided into a number of segments to which each a basic or main gradient between adjacent supporting points is assigned, so that for each of the supporting points only a deviation of the gradient at this supporting point from the related basic or main gradient has to be stored.

11 Claims, 2 Drawing Sheets

(58) Field of Classification Search
CPC ...... H02P 8/02; H02P 8/18; H02P 8/20; H02P 2209/07; H02P 27/16; H02P 6/085; H02P 6/18; H02P 8/12; H02P 8/14; H02P 8/16
USPC ......... 318/685, 400.04, 400.06, 400.08, 696, 318/254.2
See application file for complete search history.

(56) References Cited

U.S. PATENT DOCUMENTS

| | | | | |
|---|---|---|---|---|
| 4,488,216 | A * | 12/1984 | Gyugyi | H02P 27/16 318/800 |
| 4,489,259 | A * | 12/1984 | White | G05B 19/40 318/685 |
| 4,883,999 | A * | 11/1989 | Hendershot | H02K 29/06 310/179 |
| 4,920,294 | A * | 4/1990 | Christiaens | H02K 37/18 310/162 |
| 5,187,341 | A * | 2/1993 | Graell | B23H 1/022 219/69.13 |
| 5,504,408 | A * | 4/1996 | Tu | G04C 3/143 318/685 |
| 5,625,269 | A * | 4/1997 | Ikeda | H02P 8/14 318/400.34 |
| 5,770,937 | A * | 6/1998 | Tsuda | H02P 8/22 318/400.11 |
| 5,796,194 | A * | 8/1998 | Archer | H02K 29/12 310/184 |
| 5,982,134 | A | 11/1999 | Tanaka | |
| 5,986,419 | A * | 11/1999 | Archer | H02K 29/12 318/400.02 |
| 6,008,599 | A * | 12/1999 | Beck | B62D 5/0463 180/446 |
| 6,526,360 | B1 * | 2/2003 | Ito | B29C 45/7666 702/60 |
| 6,586,897 | B2 * | 7/2003 | Kim | H02P 1/163 318/254.2 |
| 6,719,396 | B2 * | 4/2004 | Anzai | H02P 29/02 347/14 |
| 7,319,300 | B2 * | 1/2008 | Hahn | H02P 6/002 318/400.08 |
| 7,995,131 | B2 * | 8/2011 | Yeh | G03B 13/32 348/345 |
| 8,299,745 | B2 * | 10/2012 | Tsuchiya | H02P 8/22 318/504 |
| 2001/0035730 | A1 * | 11/2001 | Yoshikawa | H02P 8/34 318/685 |
| 2001/0045095 | A1 * | 11/2001 | Kim | H02P 1/163 62/51.1 |
| 2003/0030403 | A1 | 2/2003 | Sasama | |
| 2003/0067507 | A1 * | 4/2003 | Anzai | B41J 19/202 347/37 |
| 2005/0057209 | A1 * | 3/2005 | Andoh | H02P 8/32 318/696 |
| 2005/0162120 | A1 * | 7/2005 | Albayrak | H02P 25/08 318/812 |
| 2006/0267531 | A1 * | 11/2006 | Hahn | H02P 6/002 318/400.04 |
| 2008/0129238 | A1 * | 6/2008 | Andersen | H02H 7/1227 318/565 |
| 2008/0197794 | A1 * | 8/2008 | Vermeir | H02P 6/085 318/400.06 |
| 2008/0297170 | A1 * | 12/2008 | Sri | G01R 31/343 324/603 |
| 2009/0175610 | A1 * | 7/2009 | Yeh | G03B 13/32 396/127 |
| 2010/0141199 | A1 * | 6/2010 | Shimada | H02P 8/22 318/696 |
| 2010/0272485 | A1 * | 10/2010 | Tsuchiya | H02P 8/22 399/361 |
| 2011/0055303 | A1 | 3/2011 | Slavin | |
| 2011/0080126 | A1 * | 4/2011 | Yabuguchi | H02P 21/0003 318/400.21 |
| 2011/0249368 | A1 * | 10/2011 | Andersen | H02H 3/162 361/23 |
| 2013/0083434 | A1 * | 4/2013 | Barth | H02P 8/02 361/31 |

\* cited by examiner

METHOD AND CIRCUIT ASSEMBLY FOR DRIVING A STEPPER MOTOR

BACKGROUND AND SUMMARY

The invention relates to a method and a circuit assembly for driving a stepper motor having 2-, 3- or more phases, by means of specified courses of current curves, in particular for a microstep operation.

In a stepper motor the rotor is rotated stepwise by each a small angle by means of a controlled and stepwise rotating electromagnetic field which is generated by means of static motor coils. For that reason stepper motors are applied always in cases in which an exact positioning of an object in a linear direction or in a direction of rotation is required. However, stepper motors are used furthermore to an increasing extent also for pure driving purposes, for which for example usual direct current motors have been used so far. A great number of different configurations of stepper motors are known, wherein it is distinguished between 2-, 3- and more-phase stepper motors according to the number of motor coils.

For electrically driving stepper motors, for example known chopper methods are used, by means of which from a supplied motor supply voltage for each of the motor coils the direction of current, level of current and shape of current to be injected at any instant of time according to a specified current (target coil current) is generated by means of PWM current pulses, in order to drive the rotor of the motor by the thus induced rotating magnetic field.

It is frequently desired to enable a motor to rotate with as small as possible step angles in order to obtain an as high as possible resolution and precision of the positioning, as well as a continuous course of the torque. For that reason it is preferred to use the so called microstep operation instead of the known full-step and half-step operation, wherein in the microstep operation the currents flowing through the motor coils are not only switched on and off, but increase and decrease in a specified manner. The precision with which the stepper motor conducts microsteps is substantially dependent on the number of different current amplitudes by which the motor coils are controlled and how exact these amplitudes can be realized. In such cases a sine-shaped and cosine-shaped excitation of the motor coils is usually most appropriate, because by this a very continuous rotation without jerks and thus a calm motor running can be obtained.

However, for certain applications the demands on the precision of the continuity of the motor running are extremely high. In order to fulfill these demands, it is necessary to adapt the course of the current curve flowing through the motor coils for generating microsteps to the geometry of the motor (i.e. the specific type of the motor and its parameters and, if applicable, as well to an individual motor). These desired optimized current curves can then be realized by a Fourier-synthesis of certain sine- or triangle-functions or combinations thereof.

The current curves thus generated are usually continuous but not necessarily monotonically increasing or monotonically decreasing. However, the four quadrants of the current curve are typically symmetrical due to the symmetrical construction of the motors, so that only a quarter of the current curve has to be stored.

Nevertheless, storing of such a curve in particular within a monolithic integrated circuit controller for stepper motors is very expensive. For each microstep of the motor, one supporting point of the current curve, i.e. one value of the amplitude of the current curve, is to be stored, wherein one memory location for that has to receive a digit with a precision according to the quantization resolution of the values of the current amplitudes. In case of 256 microsteps in each quadrant with a resolution of 256 discrete current values for each microstep, a digit with 256*8 bit for each microstep results.

In comparison to the complexity of the digital core of a usual stepper motor driver, such a high number of memory locations for the current curve makes an implementation unreasonable, already for a resolution of only some ten microsteps, and consequently is not in line with market conditions.

Experience has shown that an alternative implementation of a current curve memory in the form of a RAM unit is very expensive to integrate into a given chip-design or chip layout because a RAM unit appears as a separate layout unit. Furthermore, a RAM unit requires that a user writes into it a microstep look-up table. However, such a table cannot easily be pre-written with, for example, a sine-function via reset values. This, however, would be interesting in order to keep the universality and simplicity of the unit also for those applications for which curves need not to be programmed.

It is desirable to provide a method and a circuit assembly for driving a 2-, 3- or more phase stepper motor, with which a desired course of the amplitudes of the current curves flowing through the motor coils can be realized in a comparatively simple manner and at the same time with high precision, especially if this course deviates from the usual sine- or cosine-shape.

One advantage of this solution is that the look-up table which comprises the data which are necessary for generating the desired courses of the current curves, only needs a complexity which is reduced to about between 15 and 20% in comparison to the above mentioned memory of the complete amplitude values for each supporting point of the current curve. By this, the look-up table can be realized in the form of a flip-flop-register within the digital part of a stepper motor driver, and the layout-waste caused by a separate RAM unit can be minimized.

Furthermore, any continuous courses of current curves which can be relevant for a stepper motor can in principal be realized by a method and circuit assembly according to the invention.

Finally, the solution according to the invention has also the advantage, that the values of the current amplitudes can be read-out in both directions, i.e. for a right-handed rotation and for a left-handed rotation of the motor.

BRIEF DESCRIPTION OF THE DRAWINGS

Additional details, characteristics and advantages of the invention are described in the following description of preferred embodiments based on the drawing. The following is shown.

DETAILED DESCRIPTION

Figure 1:
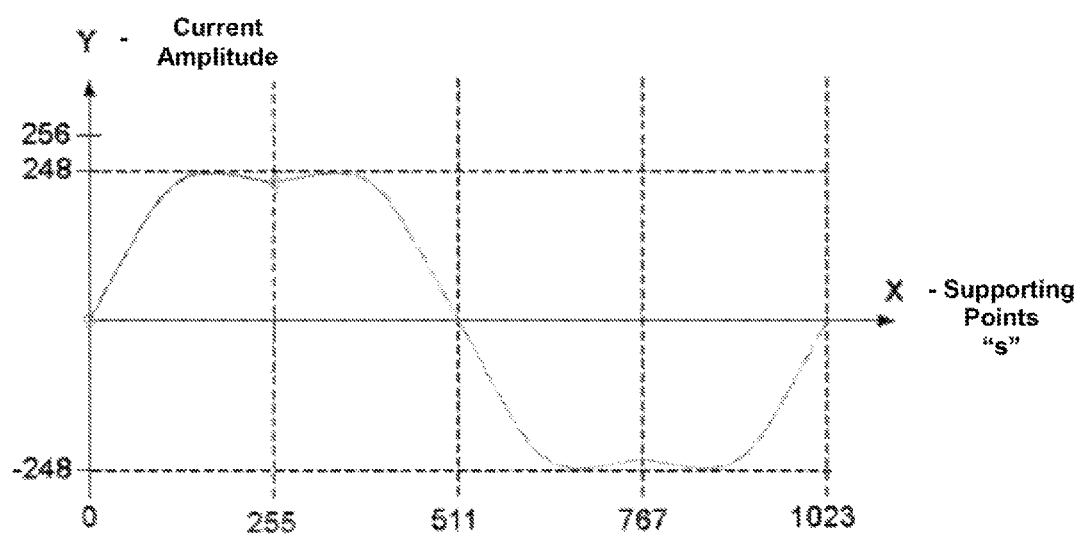
FIG. 1 a typical specified course of a current curve for the motor coils of a stepper motor.

FIG. 1 shows a typical temporal course of a specified current curve (having current amplitude values Y over the temporal axis X) over a full period for driving one phase of a stepper motor in a microstep operation in case of increased demands on the precision of the continuity of running of the motor. As mentioned above, this curve is generated by the synthesis of different sine- and triangle functions or compositions thereof in an known manner such that the demands on the running of the motor or an exact positioning are fulfilled.

The curve shows that such current courses are in general continuous, however, in mathematical sense, not necessarily monotonically increasing or monotonically decreasing. However, as mentioned above, it can be assumed that due to the symmetrical construction of the motor the course of the current in the four quadrants of one period is symmetrical as well, so that the entire curve needs to be determined and stored only for one quadrant and the courses of the current in the other quadrants can be determined from that by simple arithmetical operations by symmetrical reflections.

It is assumed for example, that according to FIG. 1 the current curve is composed along a full period of in total 1024 supporting points, wherein the temporal distances (i.e. the distances along the X-axis) between each two adjacent supporting points are preferably equal, and wherein each supporting point 0 to 1023 is assigned a quantized amplitude value Y of the current in such a manner that the course of the current curve according to FIG. 1 results. This means at the same time that the motor conducts 1024 microsteps (step resolution) over a full current period because with each current value at each supporting point one microstep is conducted. Further, it is assumed that the current amplitudes can take up to a maximum of 256 discrete positive values or (due to the said symmetry) up to a maximum of 256 discrete negative values, wherein with this, in general, a specified course of a current curve can be generated sufficiently exact. However, also other resolutions of the steps and of the quantization can be realized.

Because due to the above mentioned reasons the course of the current curve needs to be considered in one quadrant only, the invention shall be explained with reference to the enlarged view of the first quadrant of the current curve according to FIG. 2. However, these explanations of course apply analogously for the other quadrants too and by this for the entire course of the current curve.

Figure 2:
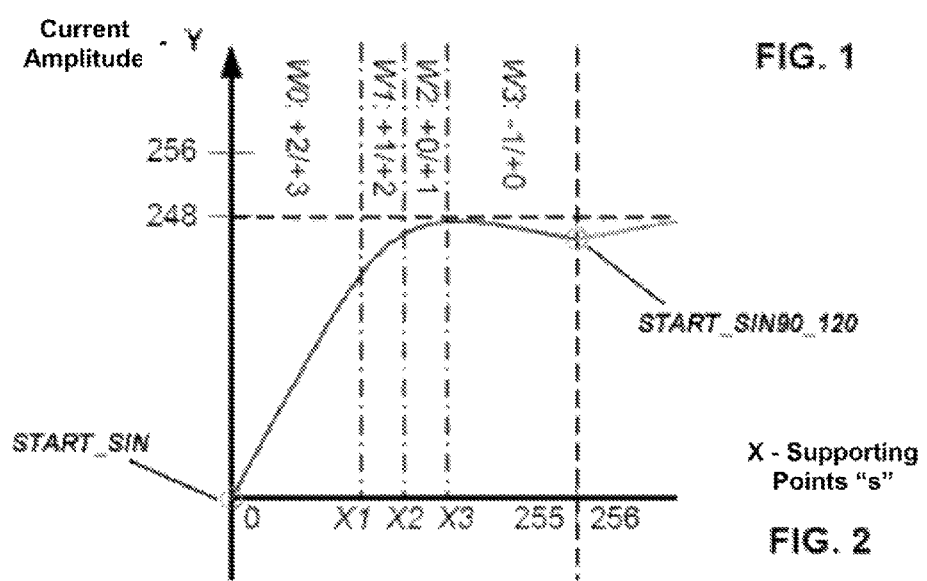
FIG. 2 an enlarged view of the first quadrant of the course of the current curve according to FIG. 1.

Within the quadrant shown in FIG. 2, 256 supporting points are present, wherein only the supporting point 0 and the supporting point 255 is denoted.

Furthermore, the first quadrant of the course of the current curve is divided according to FIG. 2 along the time axis X exemplarily into four segments W0, W1, W2, W3. The temporal length of each of the segments (which by this determines their number) is selected such that within one segment the gradient of the current curve at the individual supporting points, i.e. the number of quantization steps by which the amplitude value at one supporting point distinguishes from the amplitude value at the adjacent supporting point, deviates only comparatively slightly from a selected highest or lowest basic or main gradient of the course of the current curve within this segment, and preferably only to such an extent that this deviation at each individual supporting point can be represented each by a 1-bit value (i.e. the value 0 or 1), wherein the value 0 denotes no deviation and the value 1 denotes a deviation of the gradient which is higher (or lower, respectively) by a predetermined fixed number n of quantization steps (n=1, 2, 3, . . . ) of the current curve than the lowest (or highest, respectively) basic or main gradient which has been predetermined for this segment. However, in principle, the deviation can also be represented by a more-bit value (for example by a binary number having two or more digits), in order to obtain a more precise quantization of the deviation. However, in the following, it is assumed that the deviation is represented by the above mentioned 1-bit value.

Consequently, it is determined within each of the segments W0, W1, W2, W3 for example the each lowest gradient of the course of the current curve at a supporting point, and this is then set as the basic or main gradient. In order to conduct this, the desired course of the current curve is pre-calculated in advance and is digitized according to the resolution of the quantization (resolution of the amplitude values) as mentioned above.

Starting from this, for each of the supporting points a value "1" is then written into a look-up table if the digitized amplitude value at the particular supporting point is higher in comparison to the amplitude value at the preceding supporting point by the predetermined fixed number n of quantization steps than the basic or main gradient. If this is not the case, a value "0" is written into the table, i.e. if the digitized amplitude value at this supporting point is equal to the amplitude value at the preceding supporting point plus the basic or main gradient, or higher only by a number m<n of quantization steps.

Reversely, it is also possible to determine within each of the segments W0, W1, W2, W3 the each highest gradient of the course of the current curve at a supporting point and then set this as the basic or main gradient, and then write into the table for each of the supporting points a value "1" if the digitized amplitude value at this supporting point is lower in comparison to the amplitude value at the preceding supporting point by the predetermined fixed number n of quantization steps than the basic or main gradient. On the other hand, a value "0" is written in, if this is not the case, i.e. if the digitized amplitude value at this supporting point is equal to the amplitude value at the preceding supporting point plus the basic or main gradient, or is lower only by a number m<n of quantization steps.

Consequently, for each of the supporting points only a 1-bit value needs to be written into the table, so that instead of the above mentioned memory of 256*8 bit only a memory of 256*1 bit is required.

This means that the length of the segments, i.e. the number of supporting points within each of the segments, has to be dimensioned in case of setting the lowest gradient as the basic or main gradient such that within each segment the deviation of the gradient at each adjacent supporting points from the basic or main gradient is not greater than the predetermined fixed number n of quantization steps and, as to its amount, is not smaller than the basic or main gradient itself.

Reversely, the length of the segments, i.e. the number of supporting points within each of the segments, has to be dimensioned in case of setting the highest gradient as the basic or main gradient such that within each segment the deviation of the gradient at each adjacent supporting points from the basic or main gradient is not smaller than the predetermined fixed number n of quantization steps and, as to its amount, not larger than the basic or main gradient itself.

This means that in such sections of the course of the current curve which have a comparatively sharp curvature (and consequently in which the gradient has a strong alteration) the segments need to be comparatively short, whereas in sections, in which the gradient alters only slightly, the segments can be comparatively long.

The actual digital value Y of the current amplitude at a supporting point "s" then results in case of setting the lowest gradient as the basic of main gradient from the sum of s-times the basic or main gradient W (which amounts for example two quantization steps per each supporting point), plus the number of values "1", wherein this number is to be multiplied with the number n of quantization steps, and which, if applicable, were added each to the supporting points 0 to s.

In case of setting the highest gradient as the basic or main gradient the actual digital value Y of the current amplitude at a supporting point "s" results from the sum of s-times the basic or main gradient W (which amounts for example two quantization steps per each supporting point), minus the number of values "1", wherein this number is to be multiplied with the number n of quantization steps, and which, if applicable, were subtracted each from the supporting points 0 to s.

According to the example shown in FIG. 2, the first segment W0 extends between the supporting point 0 at the beginning of the (first) quadrant and a supporting point X1, the second segment W1 extends between the supporting point X1 and a supporting point X2, the third segment W2 extends between the supporting point X2 and a supporting point X3, and the fourth segment W3 extends between the supporting point X3 and a supporting point 255 at the end of the (first) quadrant.

The exemplary course of the current curve shown in FIG. 2 makes clear that due to the comparatively slight alteration and steady gradient in the first and fourth segment W0, W3, these segments are comparatively long, whereas in the second and third segment W1, W2 the gradient alters to a greater extent and the positive gradient changes to a negative gradient, respectively, so that these segments are accordingly shorter.

For example, according to FIG. 2, the each lowest gradient selected as the basic or main gradient W is in the first segment W0: +2, in the second segment W1: +1, in the third segment W2: 0, and in the fourth segment W3: −1.

Considering the said 1-bit value (0 or 1) which is to be added to the basic or main gradient W, as well as the above mentioned predetermined fixed number n=1 of quantization steps, this means that in the first segment W0 the current amplitude increases between two adjacent supporting points by two or by three quantization steps. In the second segment W1, the current amplitude increases between two adjacent supporting points by one or by two quantization steps, and in the third segment W2 by zero or by one quantization step. Finally, in the fourth segment W3, the current amplitude decreases between two adjacent supporting points by one quantization step or it remains unchanged.

A preferred embodiment of the invention considers the fact that due to this incremental coding of the values Y of the current amplitudes a fault, which may occur for example when changing the table during the operation of the motor, may cause a falsification of the absolute values of the current amplitudes. In order to prevent this, it is preferred to additionally store initialization values at particular supporting points in the table.

As indicated in FIG. 2, such initialization values can be located at the beginning of each quadrant, wherein in case of a sine-wave the current amplitude at the first supporting point 0 is always set to be 0.

Accordingly, in case of a cosine-wave and a 2-phase stepper motor, at the first supporting point 0 an initialization can be conducted for the 90° value.

As mentioned above and as indicated in FIG. 1, the course of the current curve is symmetrical along the whole period, so that the sequence explained above for the first quadrant repeats during the second to fourth quadrant accordingly and symmetrically, so that it can be determined by simple arithmetical operations from the values as stored in the table for the first quadrant.

Figure 3:
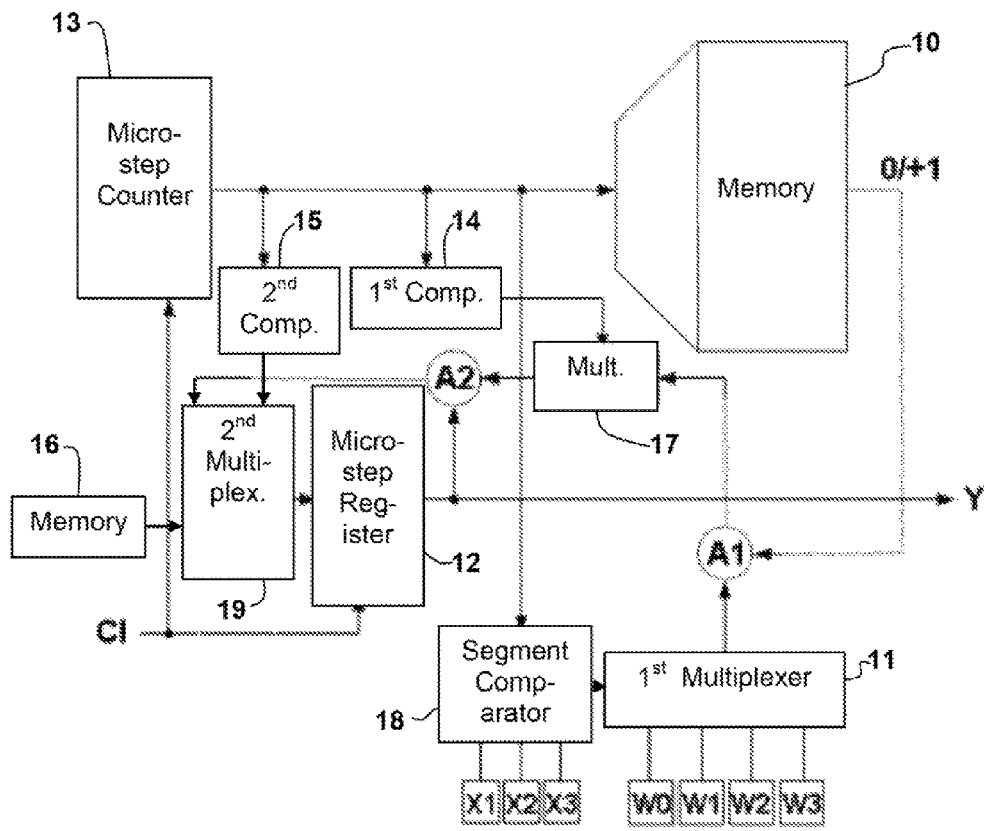
FIG. 3 an exemplary circuit diagram of a part of an integrated circuit assembly according to the invention.

FIG. 3 shows an exemplary and simplified circuit diagram of a circuit assembly for generating the values Y of the current amplitudes at each supporting point, i.e. for each microstep of a stepper motor, wherein the values Y of the current amplitudes generated at the output of the circuit assembly are supplied to a known current regulator or a known motor driver circuit. The circuit assembly exemplarily relates to the case in which the lowest gradient within a segment is set as the basic or main gradient and a preferred number n=1 of quantization steps is set. However, the circuit assembly can be accordingly adapted for the other above explained embodiments and combinations of basic and main gradients and numbers n of quantization steps.

A desired course of the current amplitude through the motor coils, as is exemplarily indicated in FIG. 1, is as explained above, in advance determined in dependence on the particular motor parameters and the requirements with respect to the continuity of the motor running and other requirements. Then, one quadrant of the course of the current amplitude is divided into segments as explained above, wherein the number and the length of the individual segments, as well as the basic or main gradient within each of the segments is calculated according to the above criteria preferably by means of an appropriate computer program.

Essential components of the circuit assembly are: a memory 10 for a look-up table, preferably in the form of a 256*1 bit RAM in case of 256 supporting points and microsteps, respectively, in each quadrant of the course of the current curve, further a microstep counter 13, a memory 16 for start values, a microstep register 12, a segment comparator 18, a first multiplexer 11 for the basic or main gradients W0, . . . W3, a second multiplexer 19 for start values, a first and a second adder A1, A2, a multiplier 17, and a first and a second comparator 14, 15. A step-clock signal is supplied to the circuit assembly via an input C1, for switching each from one microstep (and one supporting point of the course of the current curve, respectively) to a next microstep (and a next supporting point, respectively).

The step-clock signal applied at the input C1 is supplied to the microstep counter 13 which counts the clocks cyclically according to the number of supporting points in each period of the current curve, so that each actual count of the counter 13 denotes one of the supporting points of the period of the current curve.

The actual count of the counter is transmitted with each clock to the table memory 10. Then, from the look-up table stored in the table memory 10, the one 1-bit value (0 or 1) is read-out which is assigned by the table to the one supporting point of the current curve period which corresponds to the count of the counter.

The count of the counter is further provided to the segment comparator 18 with which it is determined within which segment W0, . . . Wn the actual supporting point which is represented by the count of the counter is present. For this purpose the count of the counter is compared with those stored supporting points X1, . . . Xn which each represent a cross-over or a border between two segments W0, . . . Wn. The first multiplexer 11 is controlled by the output signal of the segment comparator 18 such that at the output of the first multiplexer 11 the basic or main gradient which has been set for the determined segment applies. This basic or main gradient is then added by means of the first adder A1 to the 1-bit value which has been read-out from the table memory 10, and the sum is fed to the multiplier 17.

The count of the counter is further submitted to the first comparator 14, by means of which it is determined if the supporting point which is represented by the count of the counter is present in a positive or in a negative quadrant of the course of the current curve.

The multiplier 17 is controlled by the output signal of the first comparator 14 such that the sum which is fed to the input of the multiplier 17 is multiplied by the factor 1 if the supporting point is present in a positive quadrant, and is multiplied by the factor −1 if the supporting point is present in a negative quadrant of the course of the current curve.

The sum of the basic or main gradient and the 1-bit value which has thus been provided with a +/− sign is then supplied to the second adder A2 with which this sum is added to the output of the microstep register 12. The output signal of the second adder A2 is then fed back to the input of the microstep register 12 via the second multiplexer 19 for starting values, in order to generate by this by accumulation and addition, respectively, the current amplitude value Y for the supporting point of the course of the current curve which is represented by the supplied step-clock signal.

The second multiplexer 19 for starting values is provided for the above mentioned initialization. If at the beginning of a period of the course of the current curve (again) the first step clock is applied at the input of the circuit assembly and by this the count of the microstep counter 13 (again) takes the value 1, the second multiplexer 19 is controlled by the second comparator 15 such that instead of the output signal of the second adder A2 a starting value which is stored in the memory 16 is applied via the second multiplexer 19 to the input of the microstep register 12.

Finally, the circuit assembly shown in FIG. 3 is preferably provided with a second input which is connected with the microstep counter 13 in order to switch-over this counter by means of a switch signal between counting up and counting down, in order to enable the motor to rotate in both the forward and backward direction.

The above explained circuit assembly is preferably realized as a part of an integrated circuit controller for 2-, 3- or more phase stepper motors.

The invention claimed is:

1. Method for driving a 2-, 3- or more phase stepper motor in microsteps by a predetermined course of a current curve, wherein the course of the current curve is composed of a plurality of quantized current amplitude values (Y), each one at one of a plurality of supporting points s (s=0, 1, 2, . . . ) which have a temporal distance from each other, wherein with each one amplitude value each one microstep of the stepper motor is conducted, comprising the following steps:
 (a) temporally dividing the course of the current curve into a first number of segments (W0, W1, . . . Wn) which each comprise a second number of supporting points (s), and applying those supporting points (X1, X2, . . . Xn) which each represent a cross-over or a border between two adjacent segments at a segment comparator (18) and
 (b) setting within each of the segments a lowest or a highest basic or main gradient, with which the quantized current amplitude values of the course of the current curve at least increase and at most increase, respectively, between each two adjacent supporting points within the related segment, and applying these basic or main gradients to inputs of a first multiplexer (11), wherein
 (c) the course of the current is temporally divided into the first number of segments such that the segments each have a temporal length so that the gradients of the quantized current amplitude values between each two adjacent supporting points (s) within the segments each have at most a deviation from the set basic or main gradient within that segment which is not larger than a predetermined third number n (n=1, 2, . . . ) of quantization steps, and
 (d) storing for each of the supporting points the presence of this deviation of the gradient from the set basic or main gradient within the related segment in which the supporting point is present in a look-up table memory (10), wherein in order to conduct a microstep of the motor:
 (e) determining the quantized current amplitude value "Y" of the course of the current curve at a supporting point "s" within a segment by microstep-wise accumulation of s-times the basic or main gradient of that segment, plus and minus, respectively, the product from the sum of deviations stored in the look-up table memory for the supporting points "0" to "s" and the third number n of the quantization steps, and
 (f) driving the motor by conducting a microstep by supplying the determined current amplitude value "Y" to a known current regulator or a known motor driver circuit,
 (g) repeating steps (e) and (f) for conducting a next microstep,
 supplying a step-clock signal to a microstep counter (13) which counts the clocks cyclically according to the number of supporting points in each period of the predetermined current curve, so that each actual count of the counter denotes one of the supporting points of the period of the current curve,
 supplying the actual count of the counter to the look-up table memory (10) and reading out the deviation which is assigned to the supporting point which corresponds to the actual count,
 supplying the actual count of the counter to the segment comparator (18) for determining within which segment the actual supporting point is present by comparing the same with the applied supporting points (X1, X2, . . . Xn),
 controlling the first multiplexer (11) by the output signal of the segment comparator such that at the output of the first multiplexer the basic or main gradient which has been set for the determined segment applies,
 adding the basic or main gradient at the output of the first multiplexer to the deviation red out from the look-up table memory by means of a first adder (A1) and applying the sum to a multiplier (17) for multiplying the sum with a factor −1 if the supporting point is present in a negative quadrant of the course of the current curve, and
 adding the output of the multiplier to the output of the microstep register (12) by means of a second adder (A2) and feeding back the output of the second adder to the input of the microstep register in order to generate by accumulation and addition, respectively, at the output of the microstep register the quantized current amplitude values "Y" for the supporting points "s" of the course of the current curve.

2. Method according to claim 1,
comprising the following step:
 storing the deviations in the look-up table in the form of a 1-bit value which takes a value "I" if the basic or main gradient at the related supporting point is higher and lower, respectively, by the predetermined third number n of quantization steps of the current amplitude, than the set lowest and highest, respectively, basic or main gradient, and otherwise takes a value "0".

3. Method according to claim 1,
wherein the predetermined third number n of quantization steps equals 1.

4. Method according to claim 1,
comprising the following step:
storing for each period of the current curve at least one initialization value, and determining, starting from this value, the amplitude values at the supporting points.

5. Method according to claim 1,
comprising the following step:
storing the deviations of the gradients from the set basic or main gradient in the look-up table memory for the supporting points of one quadrant of the course of the current curve only, and determining the amplitude values of the course of the current curve in the other quadrants by symmetric reflection of the amplitude values determined for the one quadrant.

6. Circuit assembly for driving a stepper motor to be connected with the circuit assembly, by a predetermined course of a current curve, wherein the course of the current curve is composed of a plurality of quantized current amplitude values (Y), each one at one of a plurality of supporting points (s) which have a temporal distance from each other, wherein the amplitude values are supplied to a known current regulator or a known motor driver circuit for conducting each one microstep of the stepper motor, the circuit assembly comprising:
a segment comparator (18) at which those supporting points (X1, X2, . . . Xn) are applied which each represent a cross-over or a border between two of a first number of segments (W0, W1, . . . Wn) which each comprise a second number of supporting points and into which segments the course of the current curve has been temporally divided, wherein the segment comparator is provided for determining the segment, in which an actual supporting point is present, by comparing the same with the applied supporting points,
a first multiplexer (11) having inputs at which those basic or main gradients are applied which have been set for each segment as a lowest or a highest basic or main gradient with which the quantized current amplitude values of the course of the current curve at least increase and at most increase, respectively, between each two adjacent supporting points within the related segment, wherein the first multiplexer is controlled by the output of the segment comparator such that at the output of the first multiplexer the basic or main gradient which has been set for the determined segment applies,
a memory for a look-up table (10), for storing for each of the supporting points the presence of a deviation of the gradient from the set basic or main gradient within the related segment in which the related supporting point is present, wherein the course of the current is temporally divided into the first number of segments such that the gradients of the quantized current amplitude values between each two adjacent supporting points within each of the segments have at most a deviation from the set basic or main gradient within that segment which is not larger than a predetermined third number n (n=1, 2, . . . ) of quantization steps,
a microstep counter (13) at which a step-clock signal is applied and which counts the step-clock signals cyclically according to the number of supporting points in each period of the predetermined current curve, so that each actual count of the counter denotes one of the supporting points of the period of the current curve as an actual supporting point, for controlling the look-up table-memory for reading out the deviation which is assigned to the actual supporting point, and for controlling the segment comparator for determining the segment in which the actual supporting point is present,
a first adder (A1) for adding a deviation read-out from the look-up table-memory (10) at a supporting point, to the basic or main gradient supplied at the output of the first multiplexer (11) of the segment in which the supporting point is present, and
a microstep register (12) and a second adder (A2) for adding the output signal of the microstep register to the output signal of the first adder, wherein the output signal of the second adder is fed to the input of the microstep register, for generating the quantized current amplitude value "Y" at a supporting point "s" within a segment by microstep-wise accumulation of s-times the basic or main gradient of that segment, plus and minus, respectively, the product of the sum of deviations stored in the look-up table memory for the supporting points "0" to "s" and the third number n of the quantization steps.

7. Circuit assembly according to claim 6,
in which the look-up table-memory is provided for storing the deviations in the form of a 1-bit value which takes a value "1" if the gradient at the related supporting point is higher and lower, respectively, by the predetermined third number n of quantization steps of the current amplitude, than the lowest and highest, respectively, basic or main gradient set for the related segment, and otherwise takes a value "0".

8. Circuit assembly according to claim 6,
comprising a multiplier (17) for multiplying the sum at the output of the first adder with a factor −1 if the actual supporting point is present in a negative quadrant of the course of the current curve, wherein the output of the multiplier is connected with the input of the second adder.

9. Circuit assembly according to claim 6,
comprising a memory (16) for an initialization or starting value from which starting the amplitude values at the supporting points are determined.

10. Circuit assembly according to claim 9,
comprising a second multiplexer (19) having inputs at which the output of the second adder and the initialization or starting value from the memory are applied and having an output which is connected to the input of the microstep register, and being controlled by a second comparator (15) such that if at the beginning of a period of the course of the current curve the first step clock signal is applied at the second comparator, instead of the output signal of the second adder the initialization or starting value which is stored in the memory is applied via the second multiplexer to the input of the microstep register.

11. Integrated circuit controller for driving a 2-, 3- or more phase stepper motor, comprising a circuit assembly according to claim 6.

* * * * *